United States Patent
Liu et al.

(10) Patent No.: US 9,300,331 B2
(45) Date of Patent: Mar. 29, 2016

(54) METHOD, APPARATUS AND SYSTEM FOR PROVIDING PRE-EMPHASIS IN A SIGNAL

(71) Applicant: OmniVision Technologies, Inc., Santa Clara, CA (US)

(72) Inventors: Min Liu, Milpitas, CA (US); Yun Hak Koh, San Ramon, CA (US); Charles Qingle Wu, Palo Alto, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 749 days.

(21) Appl. No.: 13/673,856

(22) Filed: Nov. 9, 2012

(65) Prior Publication Data

US 2014/0132592 A1 May 15, 2014

(51) Int. Cl.
*H04B 1/04* (2006.01)
*H04N 9/00* (2006.01)
*H04L 25/02* (2006.01)
*G09G 5/00* (2006.01)

(52) U.S. Cl.
CPC ...... *H04B 1/04* (2013.01); *H04L 25/02* (2013.01); *H04N 9/00* (2013.01); *G09G 5/006* (2013.01); *G09G 2310/0289* (2013.01); *G09G 2370/08* (2013.01)

(58) Field of Classification Search
CPC .............. G09G 2300/0828; G09G 2300/0838; G09G 2300/0871; G09G 2310/027; G09G 2310/0289; G09G 5/006; G09G 2310/0264; G09G 2370/08; G09G 2310/0275; G09G 2310/0291; H04B 1/04; H04B 1/0475; H04B 1/0483; H04N 9/00; H04L 25/03006; H04L 25/02

USPC .............. 345/204, 205; 455/114.2, 114.3, 91; 375/295, 296
See application file for complete search history.

(56) References Cited

U.S. PATENT DOCUMENTS

| | | | | |
|---|---|---|---|---|
| 6,349,216 | B1 * | 2/2002 | Alberth, Jr. | ........... H03F 1/0222 375/296 |
| 7,031,668 | B2 * | 4/2006 | Darabi | ................... H03B 21/01 455/323 |
| 7,034,574 | B1 * | 4/2006 | Li | ........................ H04L 25/028 326/83 |
| 7,619,448 | B2 | 11/2009 | Wu et al. | |
| 8,355,465 | B2 * | 1/2013 | Wojtiuk | ............... H03C 3/0925 375/261 |

(Continued)

OTHER PUBLICATIONS

Kaviani et al., "A 0.4mW/Gb/s 16GB/s Near-Ground Receiver Front-End with Replica Transconductance Termination Calibration, 2012 IEEE Internationa; Solid-State Circuits Conference", (2012), 3 pgs.

(Continued)

*Primary Examiner* — Julie Anne Watko
(74) *Attorney, Agent, or Firm* — Blakely Sokoloff Taylor & Zafman LLP (57) ABSTRACT

A transmitter for generating a differential signal pair including a pre-emphasis component. In an embodiment, the transmitter comprises pre-driver circuitry including an input to receive a single-ended data signal. The differential transmitter further comprises a load circuit coupled between the input and a node coupled to an output of the pre-driver circuitry which corresponds to a constituent signal of the differential signal pair. In another embodiment, the load circuit is configurable to provide a signal path between the input and the node. A configuration of the load circuit allows for a type of pre-emphasis to be included in the constituent signal.

20 Claims, 9 Drawing Sheets

(56) References Cited

U.S. PATENT DOCUMENTS

| | | | | |
|---|---|---|---|---|
| 8,868,011 | B2* | 10/2014 | Wright | H03F 1/02 330/10 |
| 2001/0024477 | A1* | 9/2001 | Haycock | H03F 3/45771 375/296 |
| 2007/0116134 | A1* | 5/2007 | Schoenborn | G06F 13/4077 375/257 |
| 2008/0218260 | A1* | 9/2008 | Quaglietta | H03F 1/56 330/126 |
| 2009/0296851 | A1* | 12/2009 | Ono | H04L 25/0272 375/295 |
| 2011/0026638 | A1* | 2/2011 | Mu | H03D 7/1441 375/298 |
| 2011/0170628 | A1* | 7/2011 | Oishi | H04L 27/04 375/295 |
| 2012/0194224 | A1* | 8/2012 | Moon | H03K 5/1515 327/99 |
| 2014/0132592 | A1* | 5/2014 | Liu | G09G 5/00 345/214 |

OTHER PUBLICATIONS

Palmer, et al., "A 14mW 6.25Gb/s Transceiver in 90nm CMOS for Serial Chip-to-Chip Communications, ISSCC 207/Sessions 24/Multi-GB/s Transceivers/24.3, IEEE International Solid-State Circuits Conference", (2007), 3 pgs.

Wong, et al., "A 27-mW 3.6-Gb/s I/O Transceiver; IEEE Journal of Solid-State Circuits, vol. 39, No. 4, Apr. 2004", (Apr. 2004), 11 pgs.

* cited by examiner

| Cap value (fF) | 20%~80 rise/fall time (ps) |
|---|---|
| 0 | 279.2 |
| 200 | 267.4 |
| 400 | 218.2 |
| 600 | 189.5 |
| 800 | 173.3 |
| 1000 | 164.1 |

METHOD, APPARATUS AND SYSTEM FOR PROVIDING PRE-EMPHASIS IN A SIGNAL

BACKGROUND

1. Technical Field

This disclosure relates generally to differential signaling devices and more particularly, but not exclusively, to high-speed differential transmitter circuitry.

2. Background Art

Printed circuit board (PCB) traces have limited bandwidth characteristics. Consequently, when a high frequency data signal travels along a PCB trace, the data signal tends to degrade. Such degradation, often characterized by slow data signal rise times and/or slow fall times, increases the possibility of inter-symbol interference (ISI), among other problems. ISI happens when signaling for a first bit of a data symbol overlaps signaling for a last bit of a preceding symbol.

Pre-emphasis is one technique for reducing the effect of bandwidth limitations on PCB trace signaling. Pre-emphasis boosts signal amplitude at the beginning of a logic state transition. With proper pre-emphasis, rise/fall times of a signal at a receiving end of a PCB trace is reduced. Consequently, pre-emphasis helps improve data eye height and/or width.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Certain embodiments variously provide mechanisms and/or techniques for a differential signal pair to include one or more pre-emphasis components. In an embodiment, a differential transmitter comprises pre-driver circuitry including an input to receive a data signal. The differential transmitter may further comprise a load circuit coupled between the input and an output of the pre-driver circuitry—e.g. where the output corresponds to a constituent signal of the differential signal pair. The load circuit may be configurable to variously provide, at different times, different types of feedforward loading between the input and a node coupled to the output of the pre-driver circuitry. The different types of loading may allow for different levels of pre-emphasis to be included in a constituent signal of the differential signal pair.

Figure 1:
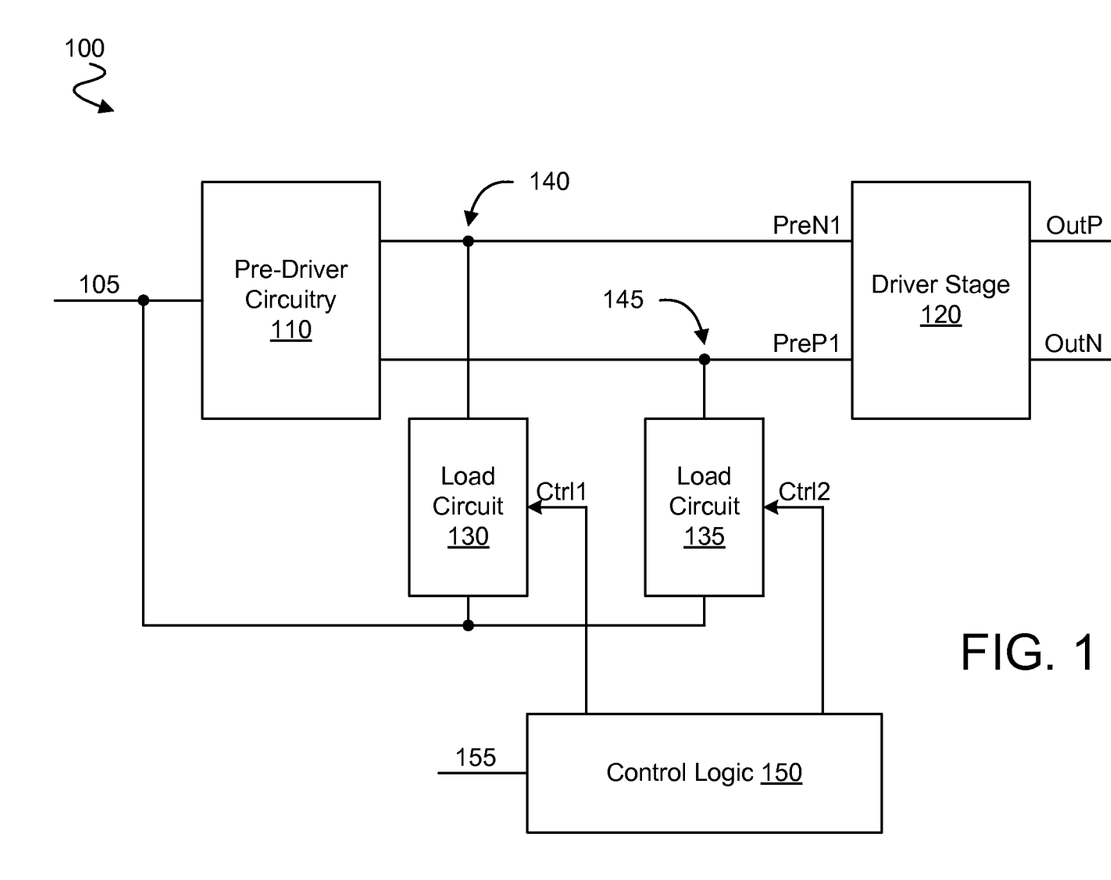
FIG. 1 is a block diagram illustrating elements of a differential transmitter according to an embodiment.

FIG. 1 illustrates elements of differential transmitter 100 for generating a differential signal pair according to an embodiment. Differential transmitter 100 may receive data from any of a variety of data sources—e.g. where differential transmitter 100 is included in, or is to couple to, a device which includes such a data source. A device including such a data source may, for example, include one or more of a computer—such as a desktop, laptop, handheld (e.g. tablet, smart phone, etc.)—digital camera, camcorder, set top box, DVD player, game console, digital video recorder and/or the like. In an embodiment, differential transmitter 100 may operate based on the received data, for generation of a differential signal pair to be transmitted to any of a variety of types of data sinks. Differential transmitter 100 may be included in, or be able to couple to, a device which includes such a data sink. A device including such a data sink may, for example, include one or more of a monitor, display, television, computer and/or the like. In an embodiment, differential transmitter 100 operates as a component of a device to transmit data to a sink which is also a component of that same device. By way of illustration and not limitation, transmitter 100 may transmit a differential signal pair to such a sink via PCB traces of such a device.

In an embodiment, differential transmitter 100 provides signal processing to support generation of a differential signal pair which represents information of data signal 105. As used herein, a "differential signal pair" (or, for brevity, simply "differential pair") refers to a pair of signals which are complementary to one another in one or more respects—e.g. where information communicated by the differential pair is represented by a difference between the two complementary signals. The term "constituent signal," as used herein, refers to a signal of a differential pair.

Data signal 105 may be a single-ended signal which, for example, provides rail-to-rail signaling. Data signal 105 may represent image sensor information, although certain embodiments are not limited in this regard. In the illustrative embodiment of FIG. 1, differential transmitter 100 includes pre-driver circuitry 110 to receive data signal 105. Pre-driver circuitry 110 may include two outputs each corresponding to a different respective constituent signal of a differential pair. By way of illustration and not limitation, a first output of pre-driver circuitry 110 may couple directly (or alternatively, indirectly) to node 140 on signal line PreN1, which is for communicating a first constituent signal of the differential pair. Alternatively or in addition, a second output of pre-driver circuitry 110 may couple directly (or alternatively, indirectly) to node 145 on signal line PreP1, which is for communicating a second constituent signal of the differential pair.

For the sake of demonstrating certain features of various embodiments, PreN signal lines are discussed herein as corresponding to an inverted version of data signal 105, and PreP signal lines are discussed herein as corresponding to a non-inverted version of data signal 105. The differential pair communicated via PreN1 and PreP1 may be considered a preliminary (or intermediate, provisional etc.) differential pair at least insofar as such a pair may be a basis for, and distinguished from, some other differential pair which, for example, differential transmitter 100 further generates and transmits.

In an embodiment, one or more characteristics of a preliminary differential pair, and/or one or more characteristics of signal lines PreN1, PreP1 carrying such a preliminary differential pair, may be insufficient for effective transmission on an interconnect such as a PCB trace. To provide for improved signal and/or signal line characteristics, differential transmitter 100 may further include driver stage 120 to receive and process the preliminary differential pair provided via nodes 140, 145. Based on the preliminary differential pair, driver stage 120 may generate a second differential pair—e.g. where an output OutN of driver stage 120 provides one signal of the second differential pair, and another output OutP of driver stage 120 provides another signal of the second differential pair. Driver stage 120 may be an output stage of differential transmitter 100, although certain embodiments are not limited in this regard. By way of illustration and not limitation, some or all of differential transmitter 100 may be implemented in an integrated circuit (IC) package, where outputs OutN, OutP are coupled each to a respective pad, pin, ball or other external contact (not shown) of the IC package.

In an embodiment, the differential pair output by driver stage 120 is an amplified version of the preliminary differential pair received via nodes 140, 145. Alternatively or in addition, driver stage 120 may provide an output impedance suitable for communication of the differential pair—e.g. for transmission of constituent signals via outputs OutN, OutP in respective traces of a PCB. By way of illustration and not limitation, driver stage 120 may provide for each of OutN, OutP a 50 respective ohm ($\Omega$) output impedance for effective transmission of respective constituent signals of a differential pair. However, any of a variety of additional or alternative output impedances may be provided by driver stage 120 according to different embodiments.

Certain embodiments variously provide for mechanisms and/or techniques for a differential transmitter to include in a constituent signal of a differential pair—or each constituent signal—a respective pre-emphasis component. For example, differential transmitter 100 may include first load circuit 130 coupled between node 140 and the input for pre-driver circuitry 110 which receives data signal 105. First load circuit 130 may include circuit logic to selectively provide one or more signal paths—e.g. including a feedforward path—between the input of pre-driver circuitry 110 and node 140. Such one or more signal paths of first load circuit 130 may allow for control of whether and/or how much of a pre-emphasis component is to be included in the constituent signal provided to driver circuit 120 via signal line PreN1.

For example, first load circuit 130 may at a given time be set to a particular configuration for providing a signal path (or combination of parallel signal paths) to implement a particular impedance of such a path or paths. By way of illustration and not limitation, a configuration of first load circuit 130 may be in response to one or more control signals Ctrl1 operating one or more switch components (not shown) of first load circuit 130. Ctrl1 may be provided, for example, by control logic 150 which is included in, or otherwise accessible to, differential transmitter 100. Such a configuration of first load circuit 130 may result in a particular level of pre-emphasis in the constituent signal provided to driver stage 120 via node 140. In an embodiment, first load circuit 130 may be set at different times to different configurations for variously providing different levels of pre-emphasis in the constituent signal provided to driver stage 120 via 140.

Alternatively or in addition, differential transmitter 100 may include second load circuit 135 coupled between node 145 and the input of pre-driver circuitry 110. Second load circuit 135 may include circuit logic to selectively provide one or more signal paths—e.g. including a feedforward path—between the input of pre-driver circuitry 110 and node 145. Such one or more signal paths of second load circuit 135 may allow for control of whether and/or how much of a pre-emphasis component is to be included in the constituent signal provided to driver circuit 120 via signal line PreP1.

For example, second load circuit 135 may at a given time be set to a particular configuration for a providing a signal path (or combination of parallel signal paths) to implement a particular impedance—e.g. including a particular capacitance—of such a path or paths. By way of illustration and not limitation, a configuration of second load circuit 135 may be in response to one or more control signals Ctrl2 operating one or more switch components (not shown) of second load circuit 135. Ctrl2 may be provided by control logic 150, although certain embodiments are not limited in this regard. Such a first configuration of second load circuit 135 may result in a particular level of pre-emphasis in the constituent signal at node 145. In an embodiment, second load circuit 135 may be set at different times to different configurations for variously providing different levels of pre-emphasis in the constituent signal at node 145.

In an illustrative scenario according to one embodiment, control logic 150 may detect indication 155 of a current state of a system in which differential transmitter 100 operates or is to operate. Indication 155 may, for example, describe or otherwise indicate a state of differential transmitter 100, a signal output from the differential transmitter 100, of a signal received from differential transmitter 100 and/or the like. In an embodiment, the indicated state includes a data rate, a change in a data rate, an acceleration of a data rate, and/or the like of communications in which differential transmitter 100 participates, or is expected to participate. An increase in a rate of data may indicate, for example, a need to increase pre-emphasis in a signal. Similarly, a decrease in a rate of data may indicate, for example, an opportunity to decrease pre-emphasis in a signal.

Control logic 150 may detect based at least in part on indication 155 that a type of pre-emphasis needs to be implemented. By way of illustration and not limitation, control logic 150 may access reference information which associates a system state with a particular level or range of levels of pre-emphasis for a differential pair. Such reference information may generated in advance of indication 155 being received—e.g. where the reference information is based on system modeling, user configuration, design specifications and/or the like.

Based on such reference information, control logic 150 may identify a configuration of first load circuit 130 and/or a configuration of second load circuit 135 to implement a desired level of pre-emphasis in the preliminary differential pair. The level of pre-emphasis may be automatically set with one or more control signals such as those of Ctrl1 and/or Ctrl2. In an embodiment, the level of pre-emphasis may be dynamically changed during operation of differential transmitter 100.

Figure 2:
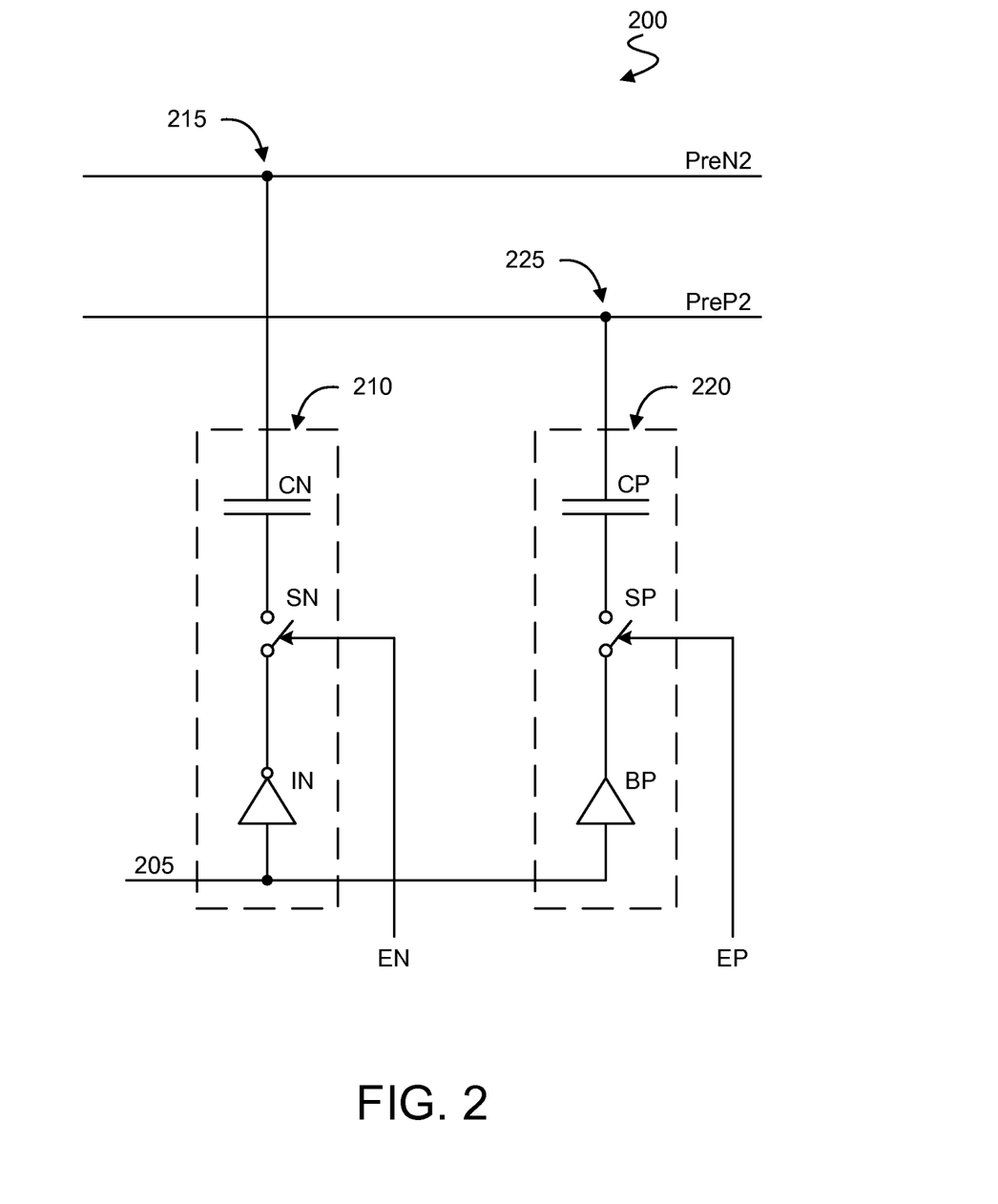
FIG. 2 is a circuit diagram illustrating elements of a differential transmitter according to an embodiment.

FIG. 2 illustrates elements of differential transmitter 200 according to an embodiment. Differential transmitter 200 may include some or all of the features of differential transmitter 100, for example. In an embodiment, differential transmitter 200 includes signal lines PreN2, PreP2 to communicate different respective constituent signals of a differential pair—e.g. a preliminary differential pair. For example, signal lines PreN2, PreP2 may variously communicate such constituent signals from respective ones of nodes 215, 225 to a driver stage (not shown) of differential transmitter 200. Nodes 215, 225 may correspond to nodes 140, 145 of differential transmitter 100, in an embodiment.

The constituent signals variously communicated by PreN2, PreP2 may be of a preliminary differential pair generated at least in part by operation of pre-driver circuitry (not shown) of differential transmitter 200. Such pre-driver circuitry may include some or all of the features of pre-driver circuitry 110, for example. In an embodiment, the preliminary differential pair is based on data signal 205 provided at an input of such pre-driver circuitry. Nodes 215, 225 may be coupled to different respective outputs of such pre-driver circuitry.

Differential transmitter 200 may include first load circuit 210 comprising circuitry to selectively provide one or more feedforward paths between node 215 and the input of the pre-driver circuitry which receives data 205. Control of such one or more feedforward paths may allow for one or more types of pre-emphasis to be selectively included in the constituent signal which is provided via PreN2. In an embodiment, the constituent signal provided via PreN2 represents an inverted version of data signal 205.

In one embodiment, load circuit 210 includes at least a first leg comprising a load, an inverter component and a switch component coupled in series with one another. By way of illustration and not limitation, a first leg of load circuit 210 may include an inverter IN, a switch SN and a capacitor CN. The particular order of such elements along the first leg is merely illustrative, and is not limiting on certain embodiments. Control signal EN may be provided to change or otherwise set a switch state of switch component SN (e.g. one of a closed state and an open state) for selectively providing and/or preventing a signal path between the pre-driver circuit input and node 215 via capacitor CN. Selectively providing and/or preventing such a signal path may contribute at least in part to whether and/or how a type of pre-emphasis is to be included in the constituent signal at node 215.

In an embodiment, load circuit 210 further includes one or more additional legs (not shown) coupled in parallel with the first leg between node 215 and the pre-driver circuitry input which receives data signal 205. Such one or more additional legs may each be variously configured—e.g. independent of the first leg and/or independent of each other—each to selectively provide (or prevent) a respective signal path between the pre-driver circuit input and node 215. With such a plurality of configurable legs coupled in parallel with one another, load circuit 210 may be variously configured to contribute any of a variety of types—e.g. levels—of pre-emphasis in the constituent signal provided via PreN2.

Differential transmitter 200 may additionally or alternatively include second load circuit 220 comprising circuitry to selectively provide one or more feedforward paths between node 225 and the input of the pre-driver circuitry which receives data 205. Control of such one or more feedforward paths may allow for one or more types of pre-emphasis to be selectively included in the constituent signal which is provided via PreP2. In an embodiment, the constituent signal via PreP2 represents a non-inverted version of data signal 205.

In one embodiment, load circuit 220 includes at least a first leg comprising a load and a switch component coupled in series with one another. By way of illustration and not limitation, a first leg of load circuit 220 may include a switch SP and a capacitor CP. The first leg may further include a buffer BP, in one embodiment. The particular order of the elements along the first leg is merely illustrative, and is not limiting on certain embodiments. Control signal EP may be provided to change or otherwise set a switch state of switch component SP (e.g. one of a closed state and an open state) for selectively providing and/or preventing a signal path between the pre-driver circuit input and node 225 via capacitor CP. Selectively providing and/or preventing such a signal path may contribute at least in part to whether and/or how a type of pre-emphasis is to be included in the constituent signal at node 225.

In an embodiment, load circuit 220 further includes one or more additional legs (not shown) coupled in parallel with the first leg between node 225 and the pre-driver circuitry input which receives data signal 205. Such one or more additional legs may each be variously configured—e.g. independent of the first leg and/or independent of each other—each to selectively provide (or prevent) a respective signal path between the pre-driver circuit input and node 225. With such a plurality of configurable legs coupled in parallel with one another, load circuit 220 may be variously configured to contribute to any of a variety of types—e.g. levels—of pre-emphasis in the constituent signal provided via PreP2.

Figure 3A:
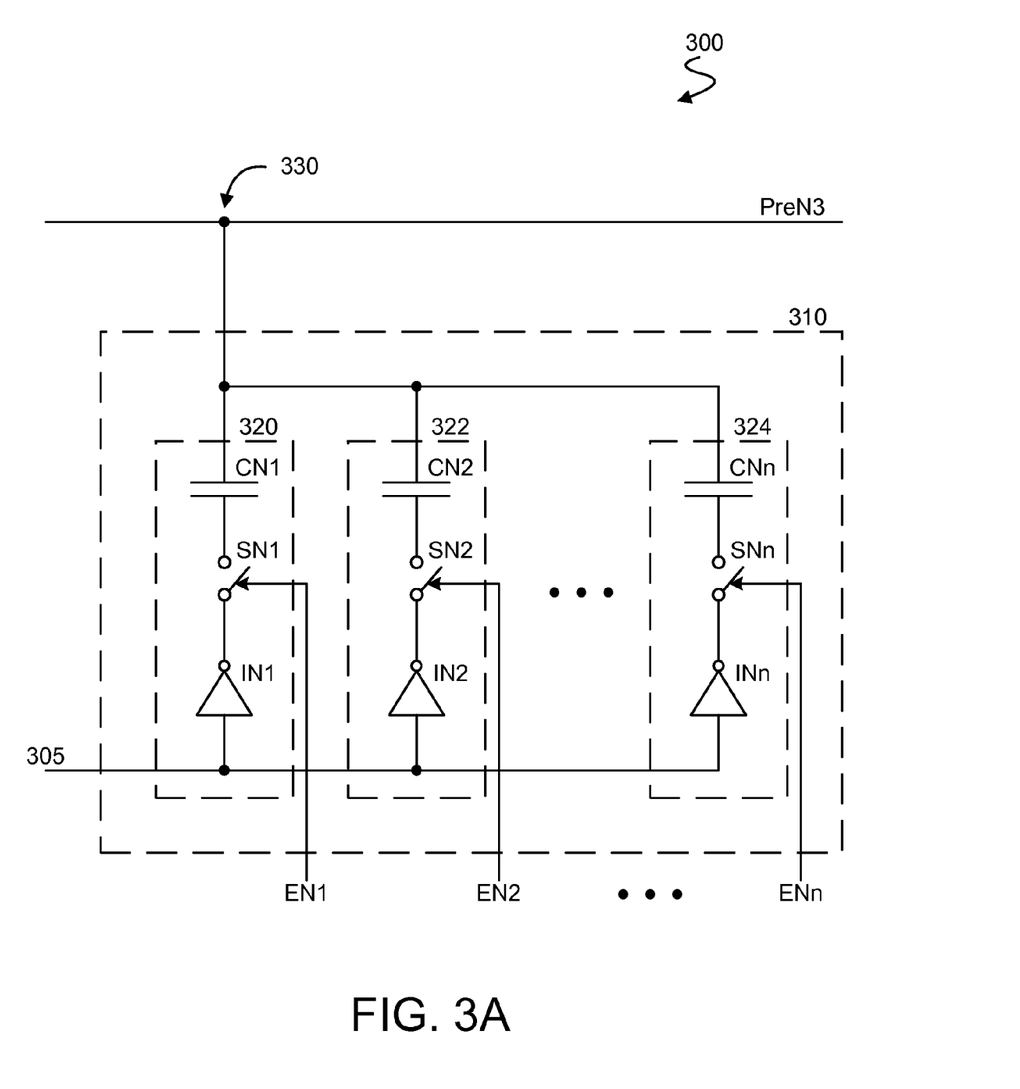
FIG. 3A is a circuit diagram illustrating elements of a differential transmitter including a load circuit according to an embodiment.

FIG. 3A illustrates elements of differential transmitter 300 according to an embodiment. Differential transmitter 300 may include some or all of the features of differential transmitter 200, for example. In an embodiment, differential transmitter 300 includes signal line PreN3 to communicate a constituent signal of a differential pair—e.g. a preliminary differential pair. For example, signal line PreN3 may communicate such a constituent signal from node 330 to a driver stage (not shown) of differential transmitter 300. Node 330 may correspond to node 215 of differential transmitter 200, in an embodiment.

The constituent signal communicated via PreN3 may be of a preliminary differential pair generated at least in part by operation of pre-driver circuitry (not shown) of differential transmitter 300. Such pre-driver circuitry may include some or all of the features of pre-driver circuitry 110, for example. In an embodiment, the preliminary differential pair is based at least in part on data signal 305 being provided at an input of such pre-driver circuitry. Node 330 may be coupled to an output of such pre-driver circuitry.

Differential transmitter 300 may include first load circuit 310 comprising circuitry to selectively provide one or more feedforward paths between node 330 and the input of the pre-driver circuitry which receives data 305. Control of such one or more feedforward paths may allow for one or more types of pre-emphasis to be selectively included in the constituent signal which is provided via PreN3. In an embodiment, such a constituent signal represents an inverted version of data signal 305.

In one embodiment, load circuit 310 includes multiple legs which each comprise a respective load, inverter component and switch component in series with one another. By way of illustration and not limitation, leg 320 of load circuit 310 may include inverter IN1, switch component SN1 and capacitor CN1. The particular order of the elements along the path of leg 320 is merely illustrative, and is not limiting on certain embodiments. Additionally or alternatively, load circuit 310 may include one or more other legs in parallel with leg 320. For example, load circuit 310 may further include leg 322 comprising inverter IN2, switch SN2 and capacitor CN2, leg 324 comprising inverter INn, switch SNn and capacitor CNn and/or any of a variety of additional or alternative legs.

In one embodiment, capacitors CN1, CN2, . . . , CNn each provide substantially the same capacitance level C for a corresponding one of legs 320, 322, . . . , 324. In such an embodiment, load circuit 310 may be selectively configured to variously provide a total capacitance substantially equal to any of capacitance levels 1C, 2C, . . . , nC. Capacitors CN1, CN2, . . . , CNn may be capable of providing a maximum total capacitance on the order of 100 femtoFarad (fF) to 500 fF, for example, although certain embodiments are not limited in this regard.

In another embodiment, capacitors CN1, CN2, . . . , CNn each provide, for a different respective integer X, a capacitance level substantially equal to $2^X C$ (for some capacitance C). For example, capacitors CN1, CN2, . . . , CNn may provide capacitance level C, 2C, . . . , $(2^n-1)C$, respectively. In such an embodiment, load circuit 310 may be selectively configured to variously provide any increment C of total capacitance between C and $(2^n-1)C$—e.g. to variously provide a total capacitance substantially equal to any of capacitance levels 1C, 2C, 3C, . . . , $(2^n-1)C$.

In an embodiment, control signal EN1 may be provided to change or otherwise set a switch state of switch component SN1 for selectively providing and/or preventing a signal path via leg 320. Control signaling may be further provided to selectively control one or more other legs of load circuit 310. By way of illustration and not limitation, control signal EN2 may variously operate switch component SN2 for selectively providing and/or preventing a signal path via leg 322. Additionally or alternatively, control signal ENn may variously operate switch component SNn for selectively providing and/or preventing a signal path via leg 324. Any of a variety of additional or alternative control signals may be provided for respective legs of load circuit 310. In an embodiment, control signaling may allow for different combinations of legs to be selectively configured at different times—e.g. allowing legs 320, 322, . . . , 324 each to variously contribute or be prevented from contributing at different times to different types of pre-emphasis in the constituent signal at node 330. For example, some or all of switch components SN1, SN2, . . . , SNn may be variously controlled—e.g. closed and/or opened—independent of one another, in an embodiment.

Differential transmitter 300 may further include another load circuit (not shown) for controlling pre-emphasis of another constituent signal which is paired with, and complementary to, the constituent signal at node 330. In such an embodiment, some or all of switch components SN1, SN2, . . . , SNn may be variously controlled independent of configuration of the other load circuit.

Figure 3B:
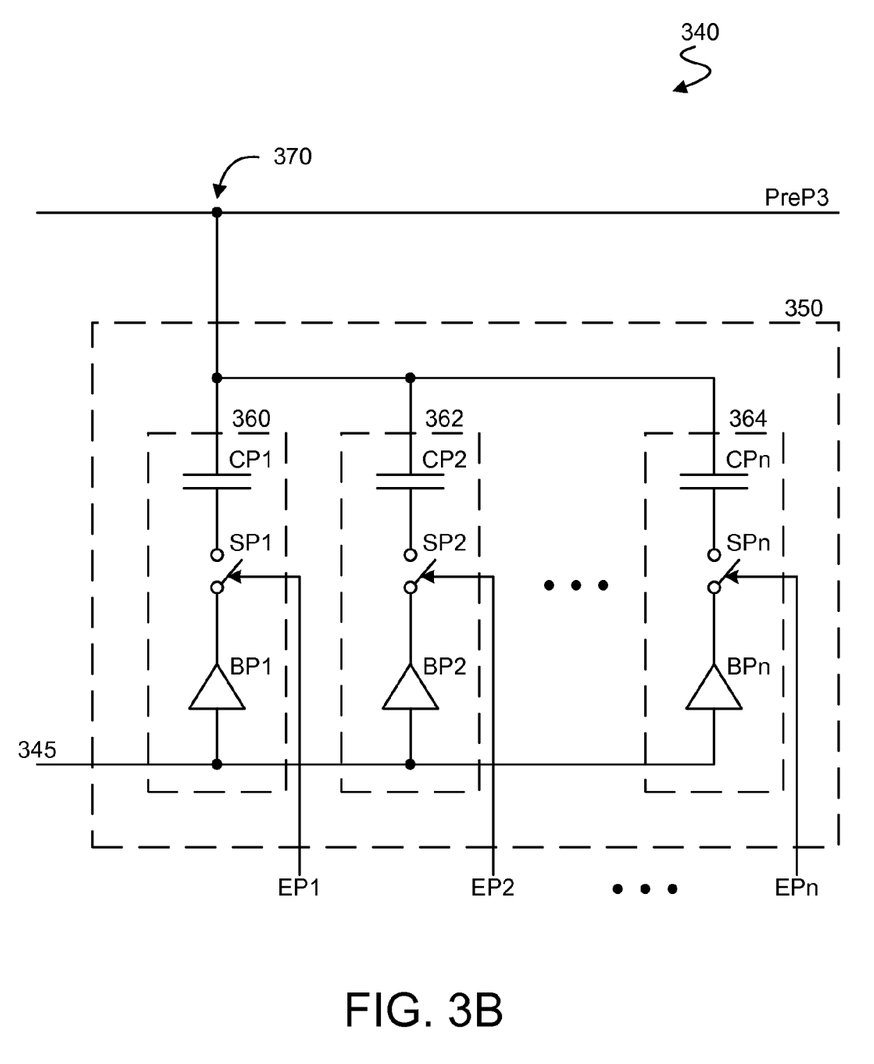
FIG. 3B is a circuit diagram illustrating elements of a differential transmitter including a load circuit according to an embodiment.

FIG. 3B illustrates elements of differential transmitter 340 according to an embodiment. Differential transmitter 340 may include some or all of the features of differential transmitter 200, for example. In an embodiment, differential transmitter 340 includes signal line PreP3 to communicate a constituent signal of a differential pair—e.g. a preliminary differential pair. For example, signal line PreP3 may communicate such a constituent signal from node 370 to a driver stage (not shown) of differential transmitter 340. Node 370 may correspond to node 225 of differential transmitter 200, in an embodiment.

The constituent signal communicated via PreP3 may be of a preliminary differential pair generated at least in part by operation of pre-driver circuitry (not shown) of differential transmitter 340. Such pre-driver circuitry may include some or all of the features of pre-driver circuitry 110, for example. In an embodiment, the preliminary differential pair is based at least in part on data signal 345 being provided at an input of such pre-driver circuitry. Node 370 may be coupled to an output of such pre-driver circuitry.

Differential transmitter 340 may include load circuit 350 comprising circuitry to selectively provide one or more feedforward paths between node 370 and the input of the pre-driver circuitry which receives data 345. Control of such one or more feedforward paths may allow for one or more types of pre-emphasis to be selectively included in the constituent signal which is provided via PreP3. In an embodiment, such a constituent signal represents a non-inverted version of the data signal 345.

In one embodiment, load circuit 350 includes multiple legs which each comprise a respective load and switch component in series with one another. By way of illustration and not limitation, leg 360 of load circuit 350 may include switch component SP1 and capacitor CP1. Leg 360 may further include a buffer BP1, although certain embodiments are not limited in this regard. The particular order of the elements along the path of leg 360 is merely illustrative, and is not limiting on certain embodiments. Additionally or alternatively, load circuit 360 may include one or more other legs in parallel with leg 360. For example, load circuit 360 may further include leg 362 comprising buffer BP2, switch SP2 and capacitor CP2, a leg 364 comprising buffer BPn, switch SPn and capacitor CPn and/or any of a variety of additional or alternative legs.

In one embodiment, capacitors CP1, CP2, . . . , CPn each provide substantially the same capacitance level C for a corresponding one of legs 360, 362, . . . , 364. In such an embodiment, load circuit 350 may be selectively configured to variously provide a total capacitance substantially equal to any of capacitance levels 1C, 2C, . . . , nC. Capacitors CP1, CP2, . . . , CPn may be capable of providing a maximum total capacitance on the order of 100 femtoFarad (fF) to 500 fF, for example, although certain embodiments are not limited in this regard.

In another embodiment, capacitors CP1, CP2, . . . , CPn each provide, for a different respective integer X, a capacitance level substantially equal to $2^X C$ (for some capacitance C). For example, capacitors CP1, CP2, . . . , CPn may provide capacitance level C, 2C, . . . , $(2^n-1)C$, respectively. In such an embodiment, load circuit 350 may be selectively configured to variously provide any increment C of total capacitance between C and $(2^n-1)C$—e.g. to variously provide a total capacitance substantially equal to any of capacitance levels 1C, 2C, 3C, . . . , $(2^n-1)C$.

In an embodiment, control signal EP1 may be provided to change or otherwise set a switch state of switch component SP1 for selectively providing and/or preventing a signal path via leg 360. Control signaling may be further provided to selectively control one or more other legs of load circuit 350. By way of illustration and not limitation, control signal EP2 may variously operate switch component SP2 for selectively providing and/or preventing a signal path via leg 362. Additionally or alternatively, control signal EPn may variously operate switch component SPn for selectively providing and/or preventing a signal path via leg 364. Any of a variety of additional or alternative control signals may be provided for respective legs of load circuit 350. In an embodiment, control signaling may allow for different combinations of legs to be selectively configured at different times—e.g. allowing legs 360, 362, . . . , 364 each to variously contribute or be prevented from contributing at different times to different types of pre-emphasis in the constituent signal at node 370. For example, some or all of switch components SP1, SP2, . . . , SPn may be variously controlled—e.g. closed and/or opened—independent of one another, in an embodiment.

Differential transmitter 340 may further include another load circuit (not shown)—e.g. load circuit 310—for controlling pre-emphasis of another constituent signal which is paired with, and complementary to, the constituent signal at node 370. In such an embodiment, some or all of switch components SP1, SP2, ..., SPn may be variously controlled independent of configuration of the other load circuit.

Figure 4:
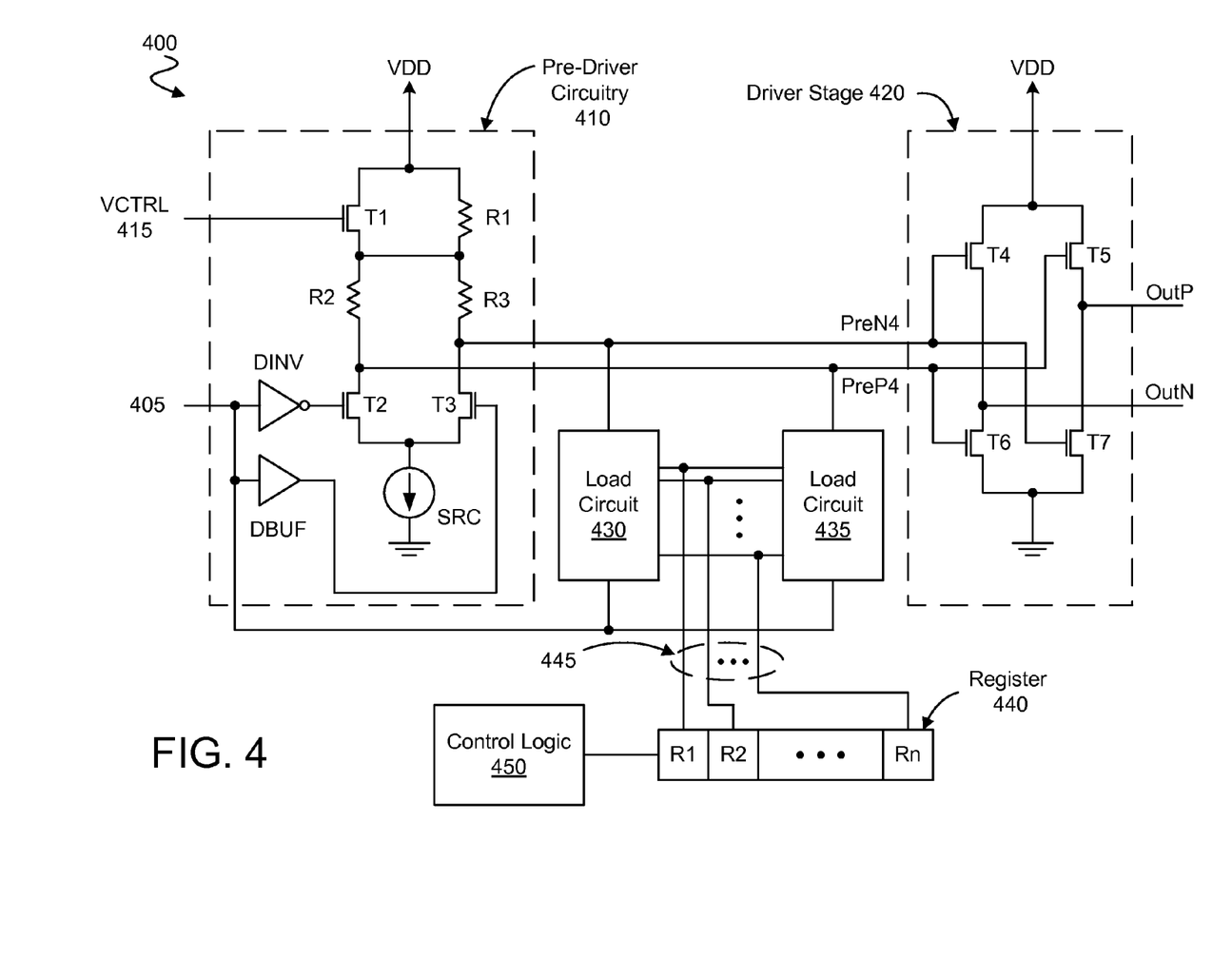
FIG. 4 is a hybrid circuit/block diagram illustrating elements of a device to transmit a differential signal according to an embodiment.

FIG. 4 illustrates elements of differential transmitter 400 for generating a differential pair according to an embodiment. Differential transmitter 400 may include one or more mechanisms to selectively provide a pre-emphasis component in a constituent signal of a differential pair. For example, differential transmitter 400 may include some or all of the features of differential transmitter 100.

In an embodiment, differential transmitter 400 includes pre-driver circuitry 410 to receive data signal 405—e.g. a single-ended, rail-to-rail data signal. Pre-driver circuitry 410 may include circuit logic to operate in support of generating a preliminary differential pair to be provided to driver stage 420 of differential transmitter 400. By way of illustration and not limitation, pre-driver circuitry 410 may include transistors T2, T3 and current source SRC coupled to variously draw current from transistors T2, T3. Pre-driver circuitry 410 may further include inverter DINV to provide an inverted version of data signal 405 to a gate of transistor T2, and buffer DBUF to provide a non-inverted version of data signal 405 to a gate of transistor T3. Respective terminals of transistors T2, T3 may be coupled, respectively, to signal lines PreP4, PreN4, which in turn may be coupled to respective inputs of driver stage 420. Signal lines PreN4, PreP4 may exchange respective constituent signals of a preliminary differential pair generated based at least in part by operation of pre-driver circuitry 410.

In an embodiment, pre-driver circuitry 410 further includes circuitry to allow selective shifting of voltage levels for either or both constituent signals of a preliminary differential pair. By way of illustration and not limitation, pre-driver circuitry 410 may include resistors—e.g. including the illustrative resistors R1, R2, R3—which are variously coupled between a supply voltage VDD and one or both of transistors T2, T3. Pre-driver circuitry 410 may further include one or more components to allow for selective variation in impedance between supply voltage VDD and either or each of transistors T2, T3. For example, pre-driver circuitry 410 may include transistor T1 for selective bypassing of resistor R1 under control of a priori control signal VCTRL 415. Operation of transistor T1 with VCTRL 415 may allow for a constituent signal of PreN4 and/or a constituent signal of PreP4 to variously shift between a relatively higher voltage range and a relatively lower voltage range, for example. Techniques for controlling operation of pre-driver circuitry 410 with VCRTL 415 are beyond the scope of this disclosure, and are not limiting on certain embodiments.

To provide for improved signal and/or signal line characteristics, differential transmitter 400 may further include driver stage 420 to receive the preliminary differential pair generated based on operation of pre-driver circuitry 410. Driver stage 420 may generate a second differential pair based on the preliminary differential pair—e.g. where an output OutN of driver stage 420 provides one signal of the second differential pair, and another output OutP of driver stage 420 provides another signal of the second differential pair.

By way of illustration and not limitation, driver stage 420 may include transistors T4, T7 comprising respective gates which are each coupled to PreN4, and transistors T5, T6 comprising respective gates which are each coupled to PreP4. Any of a variety of alternative driver architectures may be adapted for implementation in driver stage 420, according to different embodiments. Transistors T4, T5, T6, T7 may be driven by a supply voltage VDD—e.g. where a voltage level of VDD results in T4, T5, T6, T7 variously operating in saturation. In such operation, a pre-emphasis component of a preliminary differential pair results driver stage 420 providing a pronounced pre-emphasis component in a corresponding output differential pair. In an embodiment, 50Ω single-ended line impedances (or a 100Ω differential line impedance) may be achieved by driver stage 420.

Certain embodiments variously provide for mechanisms and/or techniques for a differential transmitter to include a respective pre-emphasis component in a constituent signal, or each constituent signal, of the preliminary differential pair received at driver stage 420. For example, differential transmitter 400 may include first load circuit 430 coupled between signal line PreN4 and the input for pre-driver circuitry 410. First load circuit 430 may include some or all of the features of first load circuit 210, for example. Additionally or alternatively, differential transmitter 400 may include second load circuit 435 coupled between signal line PreP4 and the input for pre-driver circuitry 410. Second load circuit 435 may include some or all of the features of second load circuit 220, in an embodiment.

Load circuit 430 and/or load circuit 435 may be variously configured at different times to facilitate one or more types of pre-emphasis components—or alternatively, in an embodiment, no pre-emphasis component—being included at different times in a constituent signal of a preliminary differential pair. By way of illustration and not limitation, one or more control signals 445 may be provided to variously change or otherwise set respective switch states for one or more switch components (not shown) of load circuits 430, 435. One or more control signals 445 may, for example, provide functionality similar to that of some or all of control signals EN, EN1, EN2, ..., ENn, EP, EP1, EP2, ..., EPn. Any of a variety of additional or alternative control signals may be provide to variously configure one or both of load circuits 430, 435.

Differential transmitter 400 may include, or otherwise have access to, control logic 450 for determining one or more control signals 445. Control logic 450 may, for example, include some or all of the features of control logic 150. In an embodiment, control logic 450 detects an indication of a level of pre-emphasis to be included in a differential pair—e.g. where the detecting is based on a state of a system which includes differential transmitter 400. In response to detecting such an indication, control logic 450 may directly or indirectly generate one or more control signals 445. By way of illustration and not limitation, control logic 450 may include or couple to register 440, where control logic 450 stores in register 440 values R1, R2, ..., Rn which each determine a corresponding value for a respective signal of one or more control signals 445. For example, values R1, R2, ..., Rn may identify various switch states to be implemented by respective switches of load circuits 430, 435.

In an embodiment, configuration of load circuit 430 is in one or more respects independent of configuration of 435. For example, control logic 450 may alternatively write to register 440 first values which determine one or more control signals to configure load circuit 430 and further write to register 440 other values which determine one or more other control signals to independently configure load circuit 435.

Figure 5A:
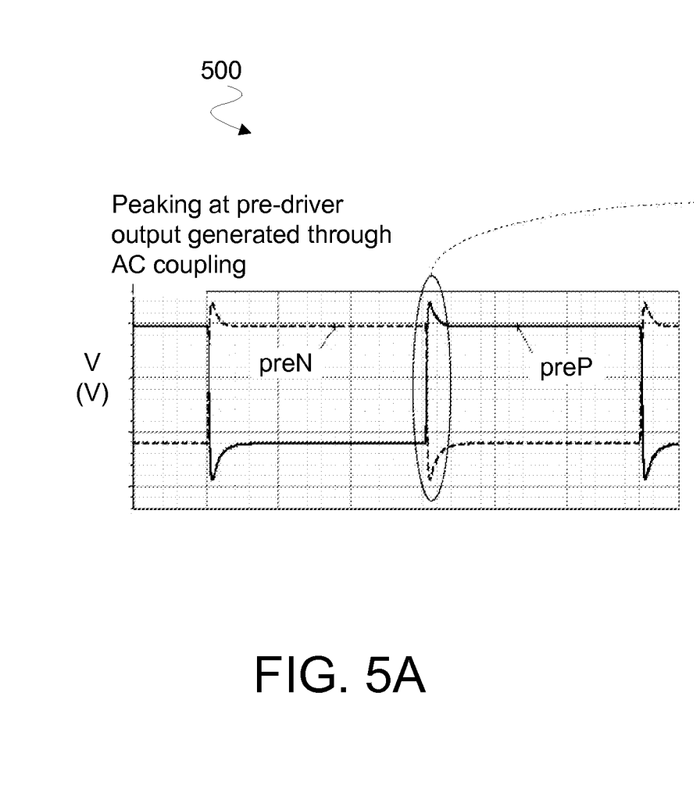
FIG. 5A is a graph illustrating a differential signal pair generated with pre-driver circuitry of a differential transmitter according to an embodiment.

FIG. 5A shows a graph 500 illustrating elements of a differential pair generated by a differential transmitter according to an embodiment. The differential pair of graph 500 may be generated, for example by differential transmitter having some or all of the features of differential transmitter 100. In graph 500, a constituent signal preN represents an inverted version of a single-ended data signal input to pre-driver circuitry of the differential transmitter. By contrast, constituent signal preP represents a non-inverted version of the single-ended data signal. Constituent signals preN, preP each include respective pre-emphasis components which, for example, may result from operation of load circuitry of the differential transmitter—e.g. where the load circuitry includes some or all of the features of load circuit 130 and/or load circuit 135. Pre-emphasis components may be indicated, for example, by signal peaking which variously takes place during respective logic state transitions in signals preN and preP. One or more characteristics of such pre-emphasis components may be based on a variable configuration of load circuitry of the differential transmitter.

Figure 5B:
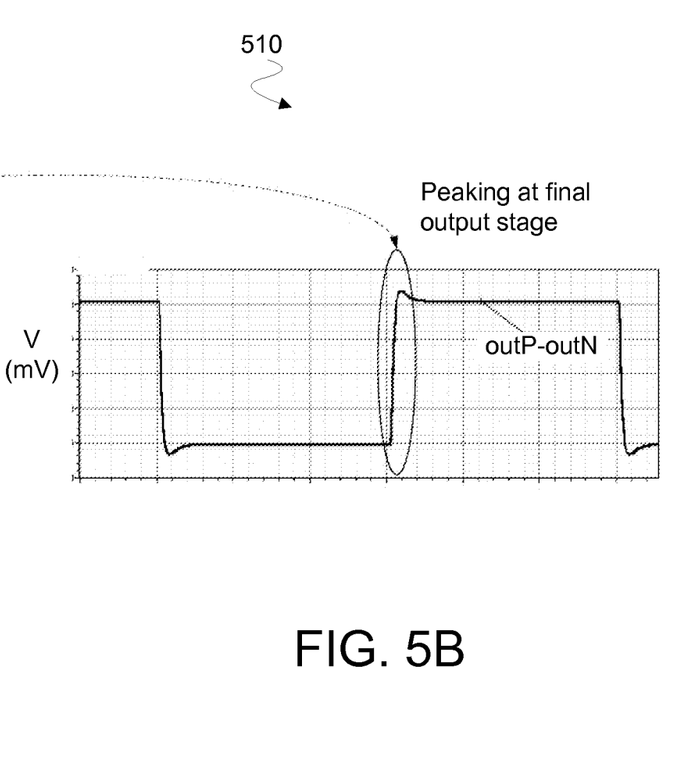
FIG. 5B is a graph showing characteristics of a differential signal pair output from a differential transmitter according to an embodiment.

FIG. 5B shows a graph 510 illustrating elements of an output differential pair generated by a differential transmitter according to an embodiment. More particularly, graph 510 illustrates a difference (OutP−OutN) between two constituent signals of an output differential pair. The output preliminary differential pair described in part by graph 500 may be generated, for example, based on a preliminary differential pair such as that shown in graph 500. For example, constituent signals OutN, OutP may be generated by a driver stage which receives constituent signals preN, preP. As shown in FIG. 5B, the difference (OutP−OutN) includes a pre-emphasis component which is based on a corresponding pre-emphasis component of the preliminary differential pair.

Figure 6A:
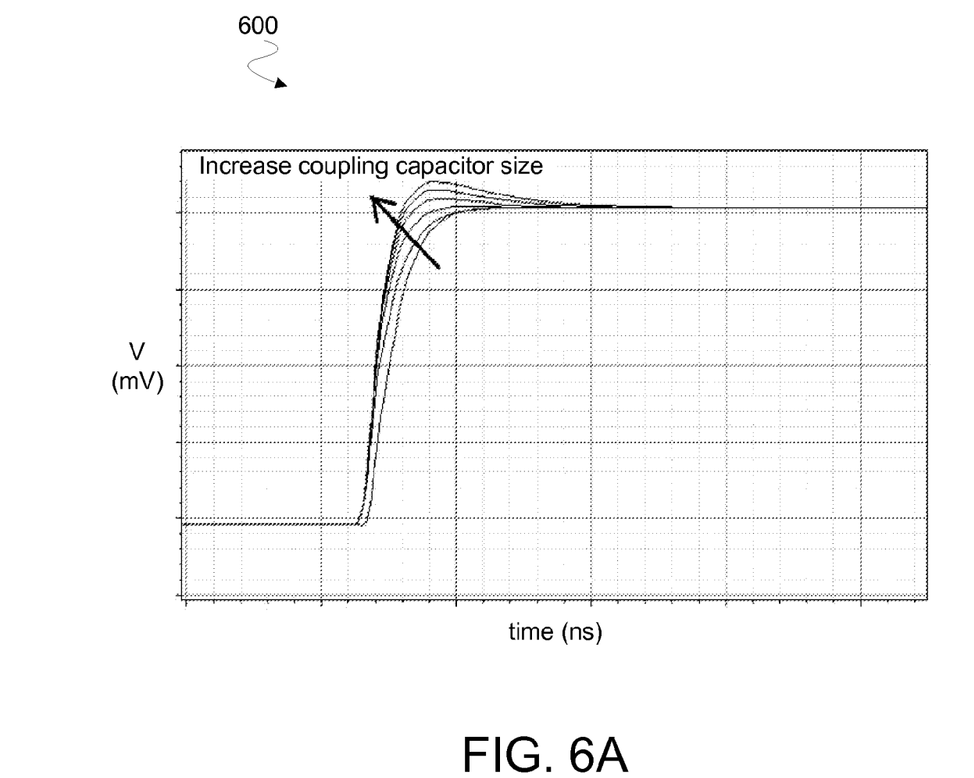
FIG. 6A is a graph illustrating pre-emphasis for respective signals variously provided by a differential transmitter according to different embodiments.

FIG. 6A shows a graph 600 illustrating multiple logic state transitions, each transition representing a respective difference between constituent signals of a corresponding differential pair. A logic state transition of graph 600 may, for example, correspond to a logic state transition shown in graph 510.

The multiple logic state transitions of graph 600 may be variously generated by the same differential transmitter—e.g. where each logic state transition is generated based on a different respective configuration of a load circuit (or load circuits) of that differential transmitter. For example, the logic state transitions of graph 600 may be variously generated by differential transmitter 400, each transition based on a different respective configuration of load circuits 430, 435.

Figure 6B:
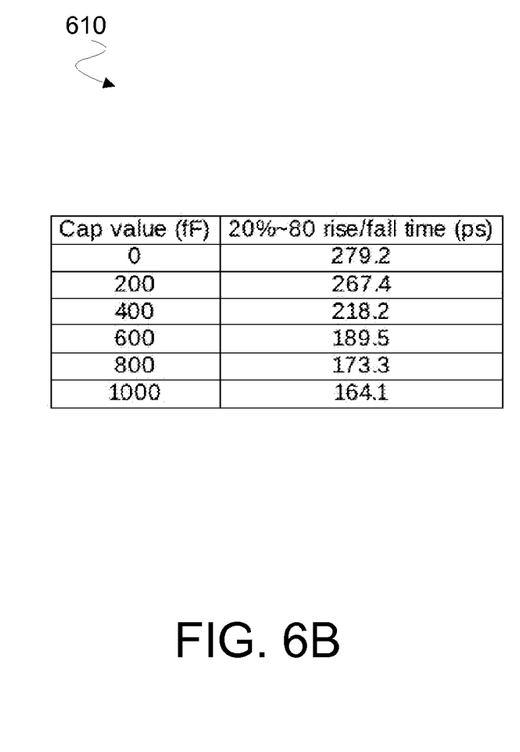
FIG. 6B is a chart listing rise/fall times for respective capacitances variously provided by a differential transmitter according to different embodiments.

As shown in graph 600, increasingly large capacitance in load circuitry—such as one or both of load circuits 300, 340—may result in increasingly pronounced pre-emphasis in one or both constituent signals of a preliminary differential pair and, in an embodiment, a resulting output differential pair. FIG. 6B includes a table 610 illustrating a relation, according to one embodiment, of load circuitry capacitance to rise/fall times of a differential pair. Different levels of capacitance may be achieved in such load circuitry, for example, by selectively setting respective switch states of switch components such as one or more of SN1, SN2, . . . , SNn, SP1, SP2, . . . , SPn.

Figure 7:
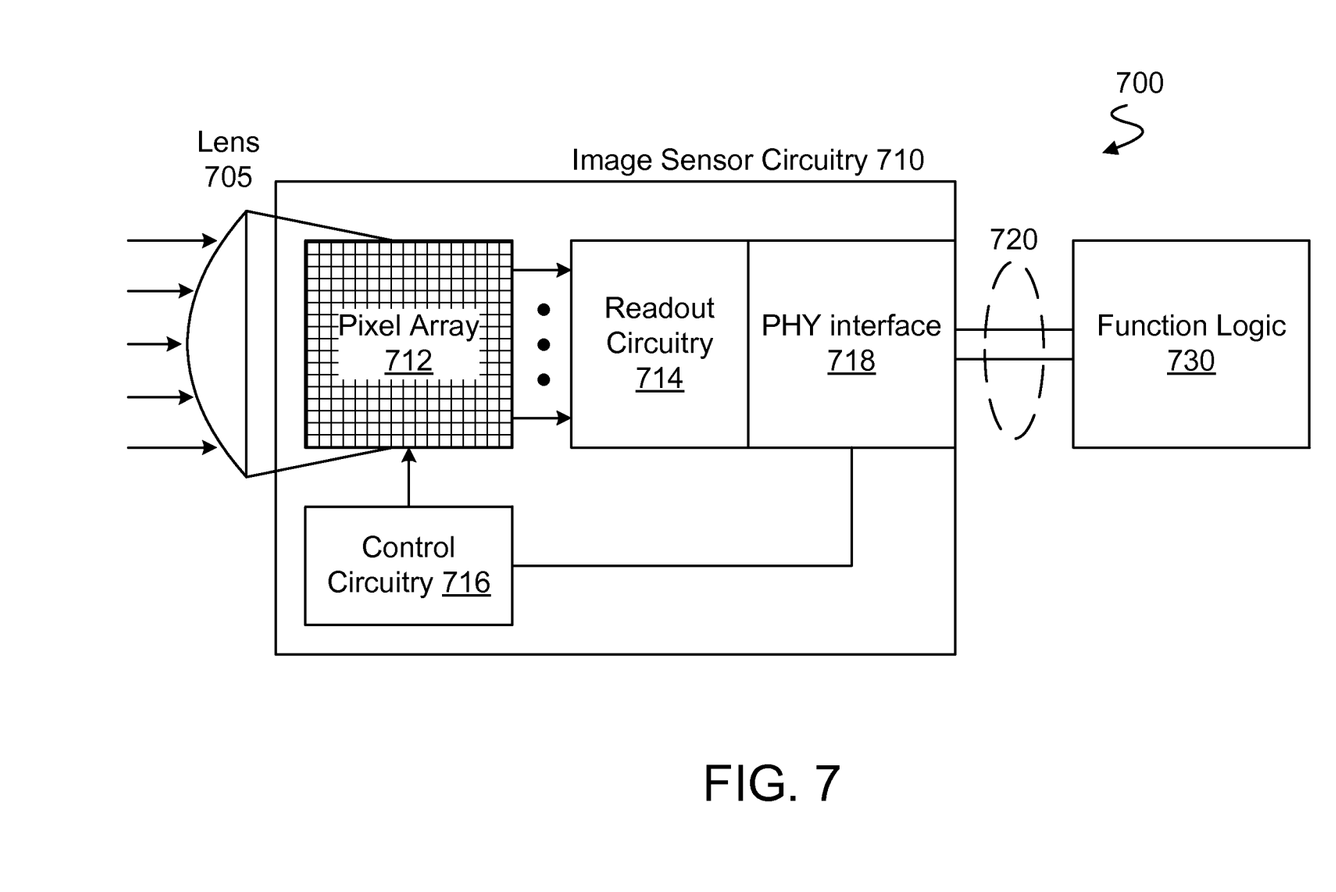
FIG. 7 is a block diagram illustrating elements of a device for communicating data according to an embodiment.

FIG. 7 is a block diagram illustrating select elements of a device 700 for communicating data according to an embodiment. Device 700 may include PHY interface 718—e.g. an interface for image sensor circuitry 710 of device 700—to generate a differential pair for providing output 720. PHY interface 718 may implement one or more of the mechanisms discussed herein for providing pre-emphasis in one or more constituent signals of a differential pair. For example, PHY interface 718 may include some or all of the features of differential transmitter 100.

Device 700 may include any of a variety of devices which having image sensing capability. By way of illustration and not limitation, device 700 may include a desktop computer, laptop computer, tablet or other handheld computer, smart phone, dedicated digital (e.g. still and/or video) camera, and the like.

Although shown in the context of an illustrative device 700, it is understood that various embodiments may be implemented entirely within an interface having characteristics of PHY interface 718. Accordingly, it is also understood that certain features of device 700 which are external to PHY interface 718 may not be limiting on certain embodiments. For example, operation of PHY interface 718 may be extended to apply to an interface which, additionally or alternatively, communicates information other than image data. Furthermore, such an interface may, additionally or alternatively, provide an interface for circuitry which relays, rather than generates, image data.

Image sensor circuitry 710 may include pixel array 712, readout circuitry 714 and control circuitry 716. Some or all of image sensor circuitry 710 may reside on an integrated circuit (IC) chip which communicates with one or more off-chip components via PHY interface 718. In an embodiment, pixel array 712 is a two-dimensional ("2D") array of backside illuminated imaging sensors or pixels. In one embodiment, each pixel is a complementary metal-oxide-semiconductor ("CMOS") imaging pixel. As illustrated, each pixel is arranged into a row and a column to acquire image data of a person, place, or object, which can then be used to render a 2D image of the person, place, or object.

Pixel array 712 may be exposed to an image—e.g. via lens 705 of device 700. After pixels of pixel array 712 have acquired their image data or image charge, the image data is readout by readout circuitry 714 and transferred directly or indirectly to function logic 730—e.g. a process running on a processor which is coupled directly or indirectly to PHY interface 718. Readout circuitry 714 may include amplification circuitry, analog-to-digital ("ADC") conversion circuitry, parallel-to-serial conversion circuitry, and/or otherwise. Function logic 730 may simply store the image data to a memory (not shown) or even manipulate the image data by applying post image effects (e.g., crop, rotate, remove red eye, adjust brightness, adjust contrast, or otherwise). In one embodiment, readout circuitry 714 may readout a row of image data at a time along readout column lines (illustrated) or may readout the image data using a variety of other techniques (not illustrated), such as a serial readout or a full parallel readout of all pixels simultaneously.

Control circuitry 716 is coupled to pixel array 712 to control operational characteristic of pixel array 712. For example, control circuitry 716 may generate a shutter signal for controlling image acquisition. In one embodiment, the shutter signal is a global shutter signal for simultaneously enabling all pixels within pixel array 712 to simultaneously capture their respective image data during a single acquisition window. In an alternative embodiment, the shutter signal is a rolling shutter signal whereby each row, column, or group of pixels is sequentially enabled during consecutive acquisition windows. Control circuitry 716 may set a configuration of PHY interface 718 for providing a particular type of pre-emphasis in output 720.

Figure 8:
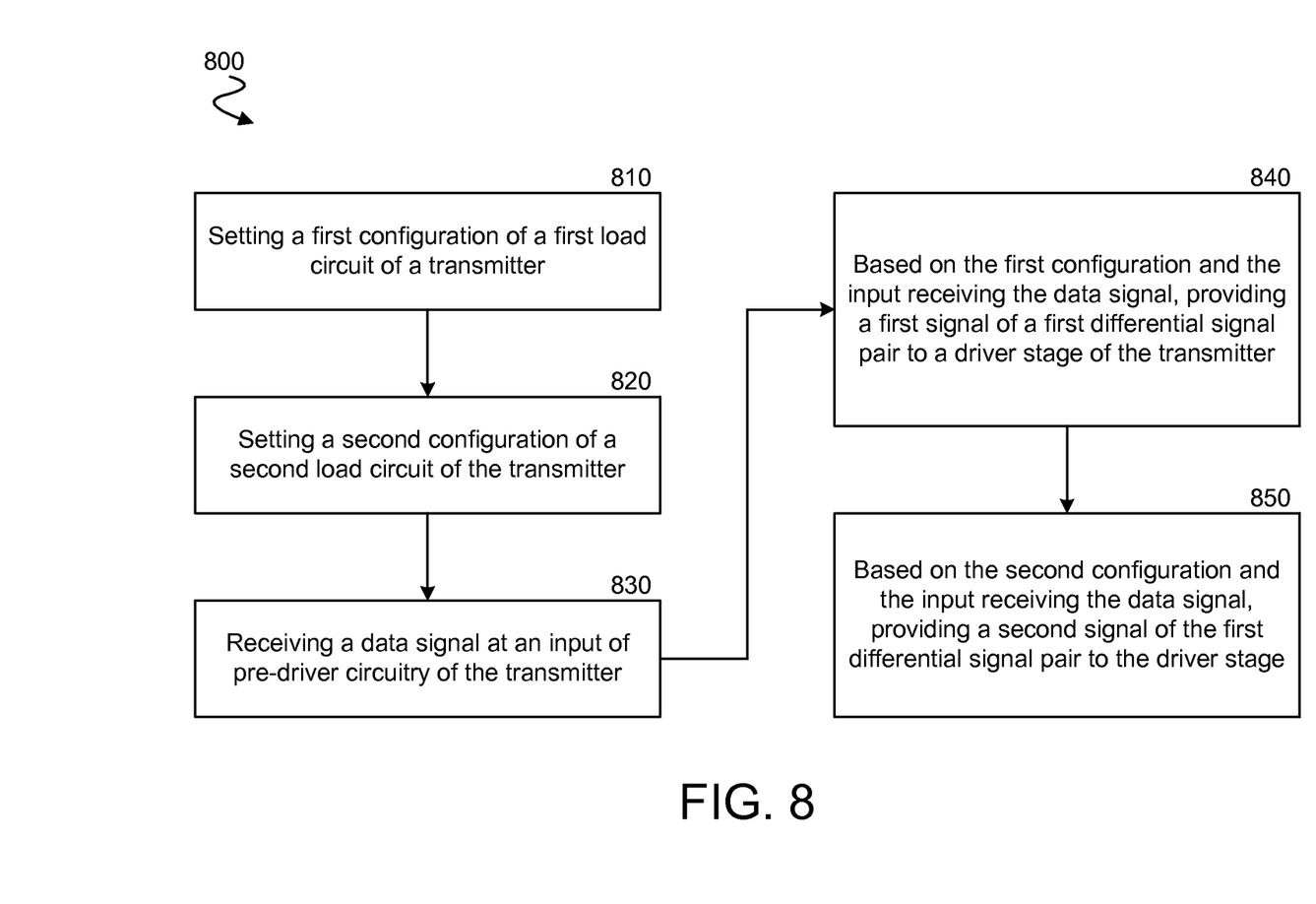
FIG. 8 is a flow diagram illustrating elements of a method for generating a differential signal pair according to an embodiment.

FIG. 8 illustrates elements of method 800 for generating a differential pair according to an embodiment. Method 800 may be performed by a transmitter having some or all of the features of differential transmitter 100, for example.

In an embodiment, method 800 includes, at 810, setting a first configuration of a first load circuit of the transmitter. The load circuit configured at 810 may, for example, provide functionality of load circuit 130. In an embodiment, the first load circuit is coupled between an input of pre-driver circuitry of the transmitter and a first node which, for example, is coupled to a driver stage of the transmitter. The first load circuit may include a first leg comprising a first load, a first inverter and a first switch which, for example, are coupled in series with one another. The first configuration may include a first switch state of the first switch. Such a first switch state may determine whether the first leg is to contribute to an inclusion of a pre-emphasis component in a first signal of a differential pair.

In an embodiment, the first load circuit further comprises first one or more additional legs each coupled in parallel with the first leg between the input and the first node, the first one or more additional legs each comprising a respective load, a respective inverter and a respective switch. In such an embodiment, setting the first configuration may comprise comprises setting a respective switch state for each switch of the first one or more additional legs.

Method 800 may further include, at 820, setting a second configuration of a second load circuit of the transmitter. The second load circuit configured may, for example, provide functionality of load circuit 135. In an embodiment, the second load circuit is coupled between an input of pre-driver circuitry of the transmitter and a second node which is also coupled to the driver stage. The second load circuit may include a second leg comprising a second load and a second switch coupled in series with one another. The second configuration may include a second switch state of the second switch. Such a second switch state may, for example, determine whether the second leg is to contribute to inclusion of a pre-emphasis component in a second signal of the differential pair.

In an embodiment, the second load circuit further comprises second one or more additional legs each coupled in parallel with the second leg between the input and the second node, the second one or more additional legs each comprising a respective load and a respective switch. In such an embodiment, setting the second configuration may comprise setting a respective switch state for each switch of the second one or more additional legs.

In an embodiment, method 800 includes, at 830, receiving a data signal at the input. Operation of the pre-driver circuitry may contribute to generation of a first differential pair which is based at least in part on the received data signal. Based on the first configuration and the input receiving the data signal, method 800 may, at 840 provide a first signal of the first differential pair via the first node to a driver stage of the transmitter. Additionally or alternatively, method 800 may provide, based on the second configuration and the input receiving the data signal, a second signal of the first differential pair via the second node to the driver stage.

Techniques and architectures for generating a differential pair are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A transmitter comprising:
  pre-driver circuitry including:
    an input to receive a data signal;
    a first output; and
    a second output;
  a driver stage coupled to the first output via a first node and coupled to the second output via a second node, the driver stage to receive via the first node a first signal of a first differential signal pair, to receive via the second node a second signal of the first differential signal pair, and to generate a second differential signal pair based on the first differential signal pair;

a first load circuit coupled between the input of the pre-driver circuitry and the first node, the first load circuit including a first leg comprising a first load, a first inverter and a first switch to operate in a first switch state for a first configuration of the first load circuit; and a second load circuit coupled between the input of the pre-driver circuitry and the second node, the second load circuit including a second leg comprising a second load and a second switch to operate in a second switch state for a second configuration of the second load circuit, wherein the first differential signal pair is generated based on the data signal, the first configuration and the second configuration.

2. The transmitter of claim 1, the first load circuit further comprising first one or more additional legs each coupled in parallel with the first leg between the input of the pre-driver circuitry and the first node, the first one or more additional legs each comprising a respective load, a respective inverter and a respective switch to operate in a respective switch state for the first configuration.

3. The transmitter of claim 2, wherein the switches of the first leg and the first one or more additional legs are each to receive a different respective control signal of a plurality of control signals for configuring the switches of the first leg and the first one or more additional legs independent of one another.

4. The transmitter of claim 1, the second load circuit further comprising second one or more additional legs each coupled in parallel with the second leg between the input of the pre-driver circuitry and the second node, the second one or more additional legs each comprising a respective load and a respective switch to operate in a respective switch state for the second configuration.

5. The transmitter of claim 4, wherein the switches of the second leg and the second one or more additional legs are each to receive a different respective control signal of a plurality of control signals for configuring the switches of the second leg and the second one or more additional legs independent of one another.

6. The transmitter of claim 1, wherein the first switch and the second switch are each to receive a different respective control signal of a plurality of control signals for configuring the first switch and the second switch independent of one another.

7. The transmitter of claim 1, further comprising control logic to set the first configuration of the first load circuit and to set the second configuration of the second load circuit.

8. The transmitter of claim 1, wherein the first load comprises a capacitor.

9. An imaging device comprising:
a pixel array;
readout circuitry to generate image data based on signals from the pixel array; and
a transmitter coupled to the readout circuitry to transmit the image data, the transmitter comprising:
pre-driver circuitry including:
an input to receive a data signal;
a first output; and
a second output;
a driver stage coupled to the first output via a first node and coupled to the second output via a second node, the driver stage to receive via the first node a first signal of a first differential signal pair, to receive via the second node a second signal of the first differential signal pair, and to generate a second differential signal pair based on the first differential signal pair;

a first load circuit coupled between the input of the pre-driver circuitry and the first node, the first load circuit including a first leg comprising a first load, a first inverter and a first switch to operate in a first switch state for a first configuration of the first load circuit; and a second load circuit coupled between the input of the pre-driver circuitry and the second node, the second load circuit including a second leg comprising a second load and a second switch to operate in a second switch state for a second configuration of the second load circuit, wherein the first differential signal pair is generated based on the data signal, the first configuration and the second configuration.

10. The imaging device of claim 9, the first load circuit further comprising first one or more additional legs each coupled in parallel with the first leg between the input of the pre-driver circuitry and the first node, the first one or more additional legs each comprising a respective load, a respective inverter and a respective switch to operate in a respective switch state for the first configuration.

11. The imaging device of claim 10, wherein the switches of the first leg and the first one or more additional legs are each to receive a different respective control signal of a plurality of control signals for configuring the switches of the first leg and the first one or more additional legs independent of one another.

12. The imaging device of claim 9, the second load circuit further comprising second one or more additional legs each coupled in parallel with the second leg between the input of the pre-driver circuitry and the second node, the second one or more additional legs each comprising a respective load and a respective switch to operate in a respective switch state for the second configuration.

13. The imaging device of claim 12, wherein the switches of the second leg and the second one or more additional legs are each to receive a different respective control signal of a plurality of control signals for configuring the switches of the second leg and the second one or more additional legs independent of one another.

14. The imaging device of claim 9, wherein the first switch and the second switch are each to receive a different respective control signal of a plurality of control signals for configuring the first switch and the second switch independent of one another.

15. The imaging device of claim 9, further comprising control logic to set the first configuration of the first load circuit and to set the second configuration of the second load circuit.

16. The imaging device of claim 9, wherein the first load comprises a capacitor.

17. A method comprising:
setting a first configuration of a first load circuit of a transmitter, the first load circuit coupled between an input of pre-driver circuitry of the transmitter and a first node, the first load circuit including a first leg comprising a first load, a first inverter and a first switch, wherein the first configuration includes a first switch state of the first switch;
setting a second configuration of a second load circuit of the transmitter, the second load circuit coupled between the input and a second node, the second load circuit including a second leg comprising a second load and a second switch, wherein the second configuration includes a second switch state of the second switch;

receiving a data signal at the input;

based on the first configuration and the input receiving the data signal, providing a first signal of a first differential signal pair via the first node to a driver stage of the transmitter;

based on the second configuration and the input receiving the data signal, providing a second signal of the first differential signal pair via the second node to the driver stage.

18. The method of claim 17, wherein the first load circuit further comprises first one or more additional legs each coupled in parallel with the first leg between the input and the first node, the first one or more additional legs each comprising a respective load, a respective inverter and a respective switch, and wherein setting the first configuration comprises setting a respective switch state for each switch of the first one or more additional legs.

19. The method of claim 17, wherein the second load circuit further comprises second one or more additional legs each coupled in parallel with the second leg between the input and the second node, the second one or more additional legs each comprising a respective load and a respective switch, and wherein setting the second configuration comprises setting a respective switch state for each switch of the second one or more additional legs.

20. The method of claim 17, wherein the first switch state and the second state are set independent of one another.

* * * * *